US008387015B2

(12) United States Patent
Christensen et al.

(10) Patent No.: US 8,387,015 B2
(45) Date of Patent: Feb. 26, 2013

(54) SCALABLE AUTOMATED EMPIRICAL TESTING OF MEDIA FILES ON MEDIA PLAYERS

(75) Inventors: Russell D. Christensen, Redmond, WA (US); Jun Ma, Bellevue, WA (US); Thomas M. Soemo, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1185 days.

(21) Appl. No.: 12/023,330

(22) Filed: Jan. 31, 2008

(65) Prior Publication Data

US 2009/0198484 A1 Aug. 6, 2009

(51) Int. Cl.
*G06F 9/44* (2006.01)
(52) U.S. Cl. .......................... 717/124; 717/127; 717/128
(58) Field of Classification Search .................. None
See application file for complete search history.

(56) References Cited

U.S. PATENT DOCUMENTS

| | | | | |
|---|---|---|---|---|
| 5,428,730 A * | 6/1995 | Baker et al. | ................... | 715/740 |
| 5,684,945 A | 11/1997 | Chen | ................... | 395/182.18 |
| 5,883,665 A * | 3/1999 | Galler et al. | ................... | 348/192 |
| 6,789,123 B2 | 9/2004 | Li | ................... | 709/231 |
| 6,948,153 B2 * | 9/2005 | Bowers | ................... | 717/124 |
| 7,010,598 B2 | 3/2006 | Sitaraman | ................... | 709/224 |
| 7,151,749 B2 | 12/2006 | Vega-Garcia et al. | ..... | 370/240.1 |
| 7,197,557 B1 | 3/2007 | Asar | ................... | 709/224 |
| 7,322,027 B2 * | 1/2008 | Tousignant | ................... | 717/127 |
| 7,702,279 B2 * | 4/2010 | Ko et al. | ................... | 455/3.06 |
| 7,958,497 B1 * | 6/2011 | Lindo et al. | ................... | 717/124 |
| 2003/0061305 A1 | 3/2003 | Copley et al. | ................... | 709/217 |
| 2004/0268319 A1 * | 12/2004 | Tousignant | ................... | 717/131 |
| 2005/0021687 A1 * | 1/2005 | Anastassopoulos et al. | . | 709/220 |
| 2005/0034103 A1 * | 2/2005 | Volkov | ................... | 717/124 |
| 2006/0069795 A1 * | 3/2006 | Tierney et al. | ................... | 709/231 |
| 2006/0107121 A1 * | 5/2006 | Mendrala et al. | ................... | 714/38 |
| 2006/0136578 A1 | 6/2006 | Covell | ................... | 709/223 |
| 2006/0253741 A1 * | 11/2006 | Garakani | ................... | 714/38 |
| 2006/0259629 A1 * | 11/2006 | Usmani et al. | ................... | 709/227 |
| 2007/0028220 A1 * | 2/2007 | Miller et al. | ................... | 717/124 |
| 2007/0113225 A1 * | 5/2007 | Felts | ................... | 717/172 |
| 2007/0157274 A1 * | 7/2007 | Chiu | ................... | 725/107 |
| 2007/0169115 A1 * | 7/2007 | Ko et al. | ................... | 717/174 |

(Continued)

OTHER PUBLICATIONS

Daniel Schonberg et al, "Fingerprinting and Forensic Analysis of Multimedia", 2004 ACM, pp. 788-795, <http://dl.acm.org/citation.cfm?id=1027712>.*

(Continued)

*Primary Examiner* — Thuy Dao
*Assistant Examiner* — Cuong V Luu
(74) *Attorney, Agent, or Firm* — Woodcock Washburn LLP

(57) ABSTRACT

Scalable empirical testing of media file playback utilizes test hooks in each media player to support simulated human interaction and playback monitoring. A media crawler catalogs media files accumulated in a media file database to create a wordlist. One or more scalable instances of media tester accesses the wordlist to select items of work linked to media files. Work items and/or operating modes of media tester specify test parameters such as performance profiles or further define testing such as specifying repetitious playback on one or more media players. Media files are downloaded to and played by a scalable number of media players. Playback performance is monitored, analyzed and reported. Failure reports are accompanied by instructions to reproduce failures and cross-references to content or source code in media files. Failures can be audited by additional work items for follow-up testing.

20 Claims, 6 Drawing Sheets

U.S. PATENT DOCUMENTS

2007/0282559 A1* 12/2007 Liu .............................. 702/124
2008/0141221 A1* 6/2008 Benesovska et al. ......... 717/124
2008/0256394 A1* 10/2008 Rashevsky et al. ............. 714/38
2009/0265692 A1* 10/2009 Godefroid et al. ............ 717/128

OTHER PUBLICATIONS

T. N. Niranjan et al, "Implementation and Evaluation of a Multimedia File System", 1997 IEEE, pp. 269-276, <http://ieeexplore.ieee.org/stamp/stamp.jsp?tp=&arnumber=609602>.*

LiuWenyin et al, "Ubiquitous media agents: a framework for managing personally accumulated multimedia files", 2003 Springer, pp. 144-156, <http://www.springerlink.com/content/dgbpm638a6ba1vwy/>.*

Ling Chen et al, "EmoPlayer: A media player for video clips with affective annotations", 2007 Elsevier B.V, pp. 17-28, <http://www.sciencedirect.com/science/article/pii/S0953543807000355>.*

Boris Rogge et al, "Timing Issues in Multimedia Formats: Review of the Principles and Comparison of Existing Formats", 2004 IEEE, pp. 910-924, <http://ieeexplore.ieee.org/stamp/stamp.jsp?tp=&arnumber=1359870>.*

M. G. Kienzle et al, "Multimedia file serving with the OS/390 LAN Server", 1997 IBM system journal, pp. 374-392, <http://ieeexplore.ieee.org/stamp/stamp.jsp?tp=&arnumber=5387161>.*

Berger, S., "Measuring and Monitoring Streaming Media Quality", Sep. 8, 2004, http://www.streamingmedia.com, 1 page.

"Optimizing Video Quality for Windows XP Media Center Edition", Windows Platform Design Notes, Draft Feb. 8, 2005, 44 pages.

* cited by examiner

SCALABLE AUTOMATED EMPIRICAL TESTING OF MEDIA FILES ON MEDIA PLAYERS

TECHNICAL FIELD

The technical field relates generally to automated testing and, more specifically, to scalable automated empirical testing of media files on media players.

BACKGROUND

Media players such as game consoles, computers, video players, and cellular telephones are usually capable of playing a number of media files such as movies, music and pictures stored in multiple formats. Media players and media files are usually created independent of one another, although with generic compatibility in mind. However, compliance with standards and specifications is not always sufficient to guarantee compatibility or the absence of defects. To guarantee accurate playback of media files on media players, some form of empirical testing may be necessary to detect any incompatibilities or defects in the media files and/or media players.

For quality assurance purposes, it is desirable for voluminous content service providers such as Microsoft Corporation to ensure that the many media files it serves to customers, e.g., through Internet accessible XBOX LIVE and XBOX LIVE Marketplace located at http://www.xbox.com, will playback properly on Microsoft's XBOX 360 gaming console or other supported media player. XBOX, XBOX 360, and XBOX LIVE are registered trademarks of Microsoft Corporation, One Microsoft Way, Redmond, Wash. 98052-6399. XBOX LIVE is a full spectrum online gaming and entertainment service. Besides providing online multiplayer gaming, through XBOX LIVE and XBOX LIVE Marketplace, customers can download purchased and promotional content to their XBOX 360 hard drive, computer or other media player, including high definition and standard definition television shows, movies, gaming videos, music videos, short feature films, video games, dashboard themes, slideshows, gamer pictures, game trailers/demos, movies, game content such as new maps, weapons, levels, characters, challenges, expansions, arcade games, demos and trailers. The thousands of media files available on XBOX LIVE may be produced by Microsoft and many other companies.

While human screeners may review playback of media files on various playback devices such as the XBOX 360, reliance on humans has inherent limitations, including physical and mental fatigue, forgetfulness, and inconsistency. For example, a human screener may doze off or otherwise fail to pay attention periodically during playback or may forget to pause playback during a break. Humans may also suffer eye strain while critically reviewing media file playback hours on end. Further, perceptions of playback may vary from one human to the next. Further still, time and budgetary constraints make it nearly impossible to review all media files, especially after every hardware, firmware or software improvement to playback devices. In short, as the volume of media content grows, it becomes more and more infeasible to manage content validity. Thus, at present, too much reliance on quality assurance is left to customer reporting.

SUMMARY

This Summary is provided to introduce a selection of concepts in a simplified form that are further described below in the Detailed Description Of Illustrative Embodiments. This Summary is not intended to identify key features or essential features of the claimed subject matter, nor is it intended to be used to limit the scope of the claimed subject matter.

Scalable empirical automated testing of voluminous media files on media players is accomplished by utilizing test hooks in each media player and/or in accessory devices such as game controllers or remote controls communicatively coupled to each media player to support simulated human interaction and playback monitoring. The scalable test environment may be centralized or distributed. Media files requiring testing may be accumulated in a media file database. A media crawler may catalog media files stored in the media file database to create a wordlist. A scalable number of instances of a media tester program may access the wordlist to select items of work linked to media files. Selection of work items may be done randomly or by checkout to avoid collisions with other instances of the media tester program. Work items and/or operating modes of media tester may specify test parameters such as performance profiles or further define testing such as by specifying repetitious playback on one or more media players. Media files are downloaded to and played by a scalable number of media players. Simulated human interaction with media players to play media files may involve simulating human inputs necessary to load media files and navigate menus. Media applications such as games may be accompanied by supporting information used during testing to simulate human interaction with an input device such as a game controller or remote control in order to simulate, for example, a human playing a movie or video game. Media file playback or media application execution performance may be monitored, analyzed and reported. Failure reports may be accompanied by instructions to reproduce failures and cross-references to content and/or source code. Failures may be audited by follow-up testing.

Empirical testing offers very useful real-world feedback because testing closely follows scenarios that customers follow while playing media files or media applications. Automated empirical testing navigates the same user interface, triggers the same code paths on the same hardware and results in the same memory footprints experienced by media players used by customers. As such, empirical test results are more realistic and useful than emulation test results. A scalable empirical testing system with ones, tens, hundreds or more media players operating 24 hours per day 365 days per year permits content providers to process large volumes of media files in short periods of time, which permits greater flexibility in making software improvements to media players. A scalable empirical testing system permits testing throughout development and production of hardware and software builds of media players. A scalable empirical testing system also removes the burden of testing from customers, increases the level of confidence customers have in downloaded content and, ultimately, improves the quality reputation of content service providers having such a system.

BRIEF DESCRIPTION OF THE DRAWINGS

The foregoing summary, as well as the following detailed description, is better understood when read in conjunction with the appended drawings. For the purpose of illustrating scalable automated empirical testing of media files on media players, there is shown in the drawings exemplary constructions thereof; however, scalable automated empirical testing of media files on media players is not limited to the specific methods and instrumentalities disclosed.

DETAILED DESCRIPTION OF ILLUSTRATIVE EMBODIMENTS

Figure 1:
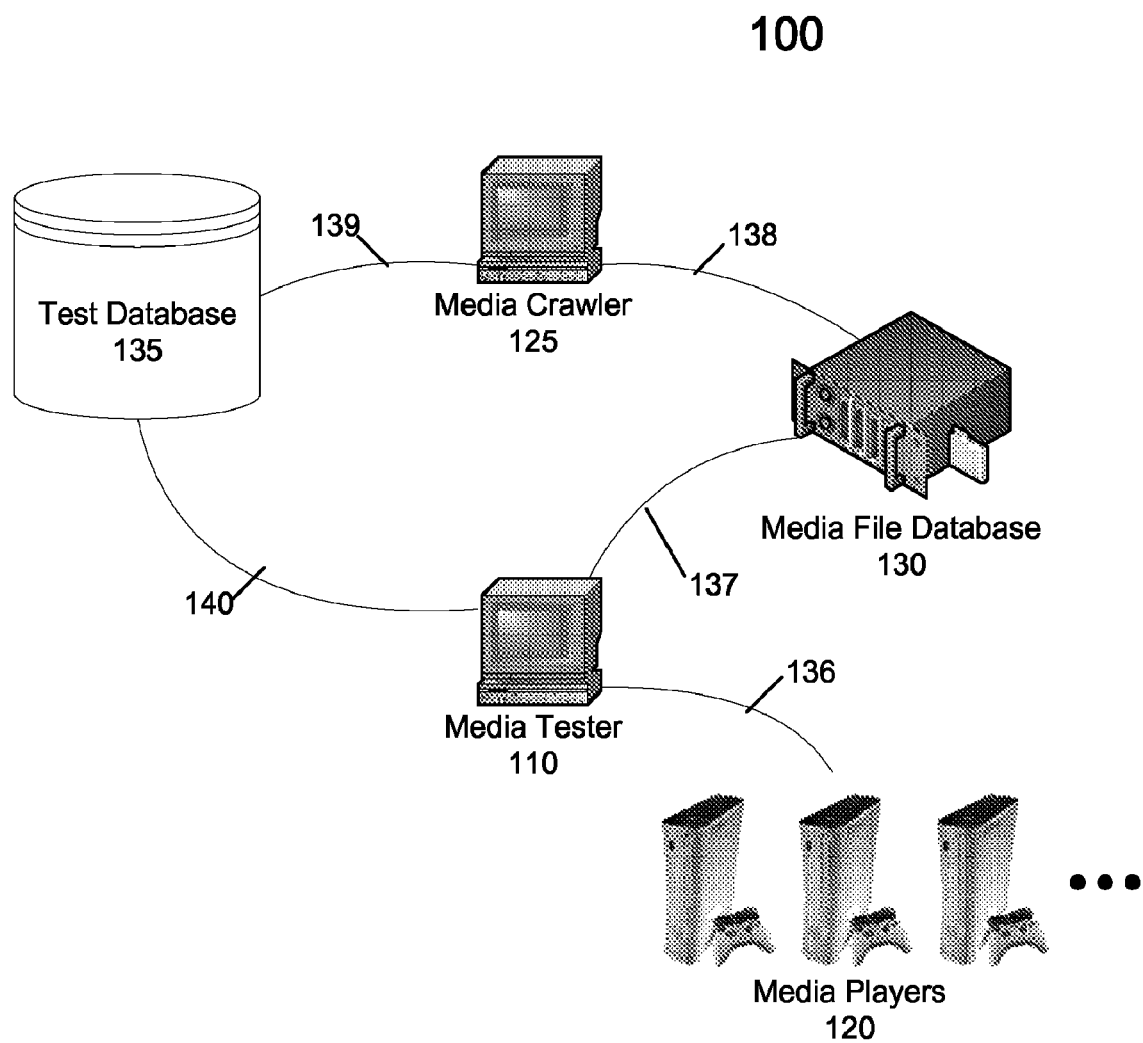
FIG. 1 is a block diagram of an exemplary system in which scalable automated empirical testing of media files on media players can be implemented.

Reference will now be made in detail to embodiments of the present technology for scalable automated empirical testing of media files on media players, examples of which are illustrated in the accompanying drawings. While the technology for scalable automated empirical testing of media files on media players will be described in conjunction with various embodiments, it will be understood that they are not intended to limit the present technology for scalable automated empirical testing of media files on media players to these embodiments. On the contrary, the presented technology for scalable automated empirical testing of media files on media players is intended to cover alternatives, modifications, and equivalents, which may be included within the spirit and scope the various embodiments as defined by the appended claims. Furthermore, in the following detailed description, numerous specific details are set forth in order to provide a thorough understanding of the present technology for scalable automated empirical testing of media files on media players. However, the present technology for scalable automated empirical testing of media files on media players may be practiced without these specific details. In other instances, well known methods, procedures, components, and circuits have not been described in detail as not to unnecessarily obscure aspects of the present embodiments.

Unless specifically stated otherwise as apparent from the following discussions, it is appreciated that throughout the present detailed description, discussions utilizing terms such as "opening", "determining", "sequencing", "reading", "loading", "overriding", "writing", "creating", "including", "comparing", "receiving", "providing", "generating", "associating", and "arranging", or the like, refer to the actions and processes of a computer system or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present technology for scalable automated empirical testing of media files on media players is also well suited to the use of other computer systems such as, for example, optical and mechanical computers. Additionally, it should be understood that in embodiments of the present technology for scalable automated empirical testing of media files on media players, one or more of the steps can be performed manually.

Overview of Terminology

The following terms should be considered in light of the following overviews provided for them as well as the context in which they appear.

Media file: computerized information accessible by one or more media players or software programs running thereon that is used by a media player to generate audible, visual or other sensory information.

Media content: a media file or media application/program such as a video game.

Media player: any device capable of accessing one or more media files and having at least one integrated audible, visual or other sensory presentation device or at least one output thereto. Media Player includes, but is not limited to, fixed or portable game consoles, computers, audio and/or video players, cellular telephones. Some media players, such as XBOX 360, are able to access media content, e.g., play media files and execute media applications.

Failure: Any unintended sensory presentation or other performance flaw falling outside a desired performance profile relating to access to a media file by a media player. A failure may occur in media player hardware, firmware, operating system, application, etc. or in media file or media application.

Scalable empirical automated testing of voluminous media files on media players is accomplished by utilizing test hooks in each media player and/or in accessory devices such as game controllers or remote controls communicatively coupled to each media player to support simulated human interaction and playback monitoring. The scalable test environment may be centralized or distributed. Media files requiring testing may be accumulated in a media file database. A media crawler may catalog media files stored in the media file database to create a work item list. A work item list can comprise list of test cases that can be stored in a database or the like (e.g., SQL database) for query access. One or more instances of a media tester program may access the wordlist to select items of work linked to media files. Selection of work items may be done randomly or by checkout to avoid collisions with other instances of the media tester program. Work items and/or operating modes of media tester may specify test parameters such as performance profiles or further define testing such as by specifying repetitious playback on one or more media players. Media files are downloaded to and played by one or more media players. Simulated human interaction with media players to play media files may involve simulating human inputs necessary to load media files and navigate menus. Media applications such as games may be accompanied by supporting information used during testing to simulate human interaction with an input device such as a game controller or remote control in order to simulate, for example, a human playing a video game. Media file playback or media application execution performance may be monitored, analyzed and reported. Failure reports may be accompanied by instructions to reproduce failures and cross-references to content and/or source code. Failures may be audited by follow-up testing.

FIG. 1 is a block diagram of an exemplary system in which scalable automated empirical testing of media files on media players can be implemented. Numerous components have been simplified or omitted from FIG. 1 in order to focus on selected features of scalable automated empirical testing of media files on media players. In the embodiment shown in FIG. 1, empirical testing system 100 comprises at least one instance of media tester 110, a scalable number of media players 120, media crawler 125, media file store 130 and test database 135. Media players 120 is referenced in the singular, as in media player 120 as well as in the plural media players 120. It is to be understood that the configuration of the scalable empirical testing system 100 depicted in FIG. 1 is not limited thereto. For example, each of the components of the scalable empirical testing system 100 can comprise a single processor or multiple processors. And, each of the components can be configured as a centralized component and/or a distributed component. Further, the scalable empirical testing system 100 can be configured as a centralized computing environment and/or a distributed computing environment.

Figure 5:
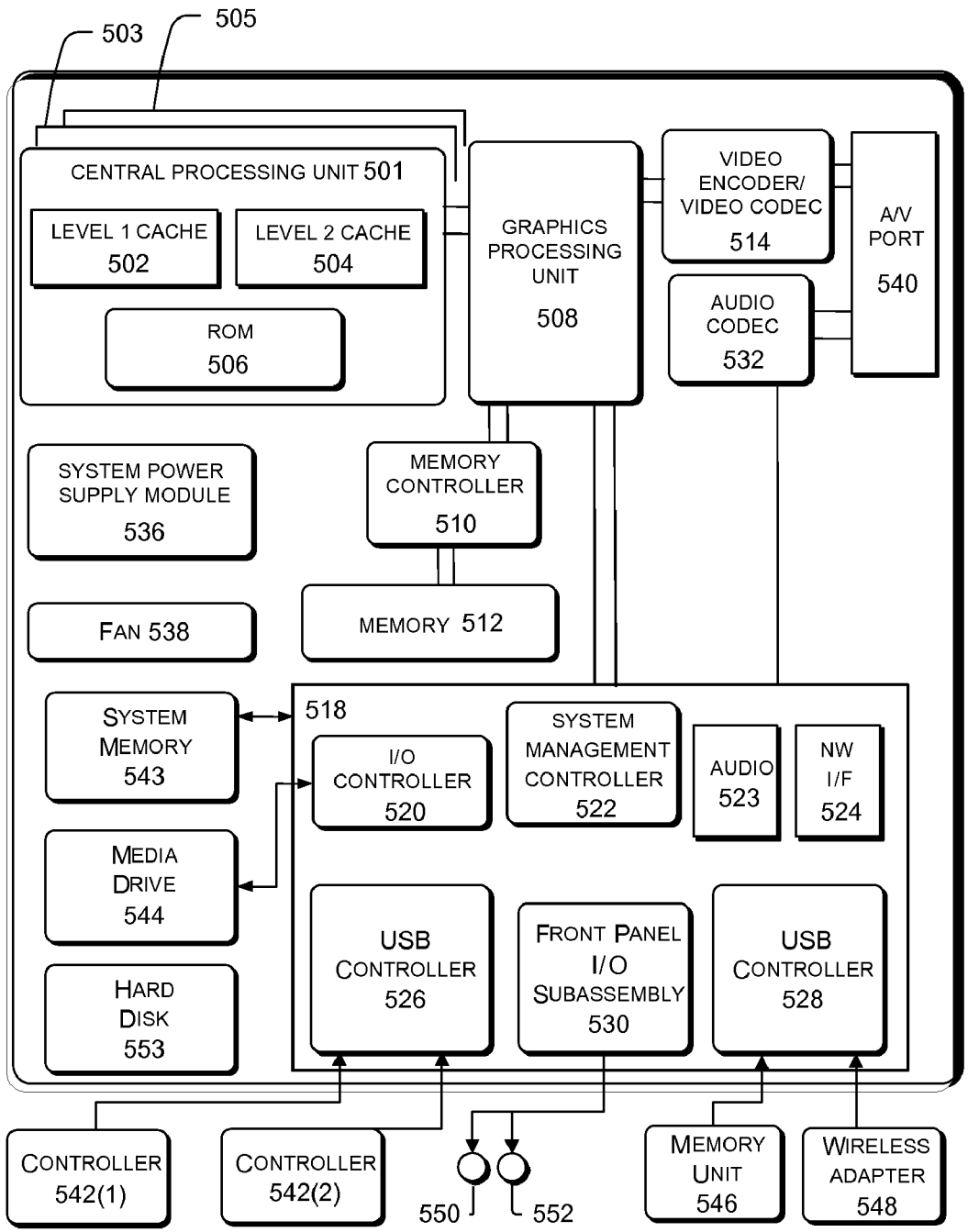
FIG. 5 is a block diagram of an exemplary game console in which various aspects of scalable automated empirical testing of media files on media players can be implemented.
Figure 6:
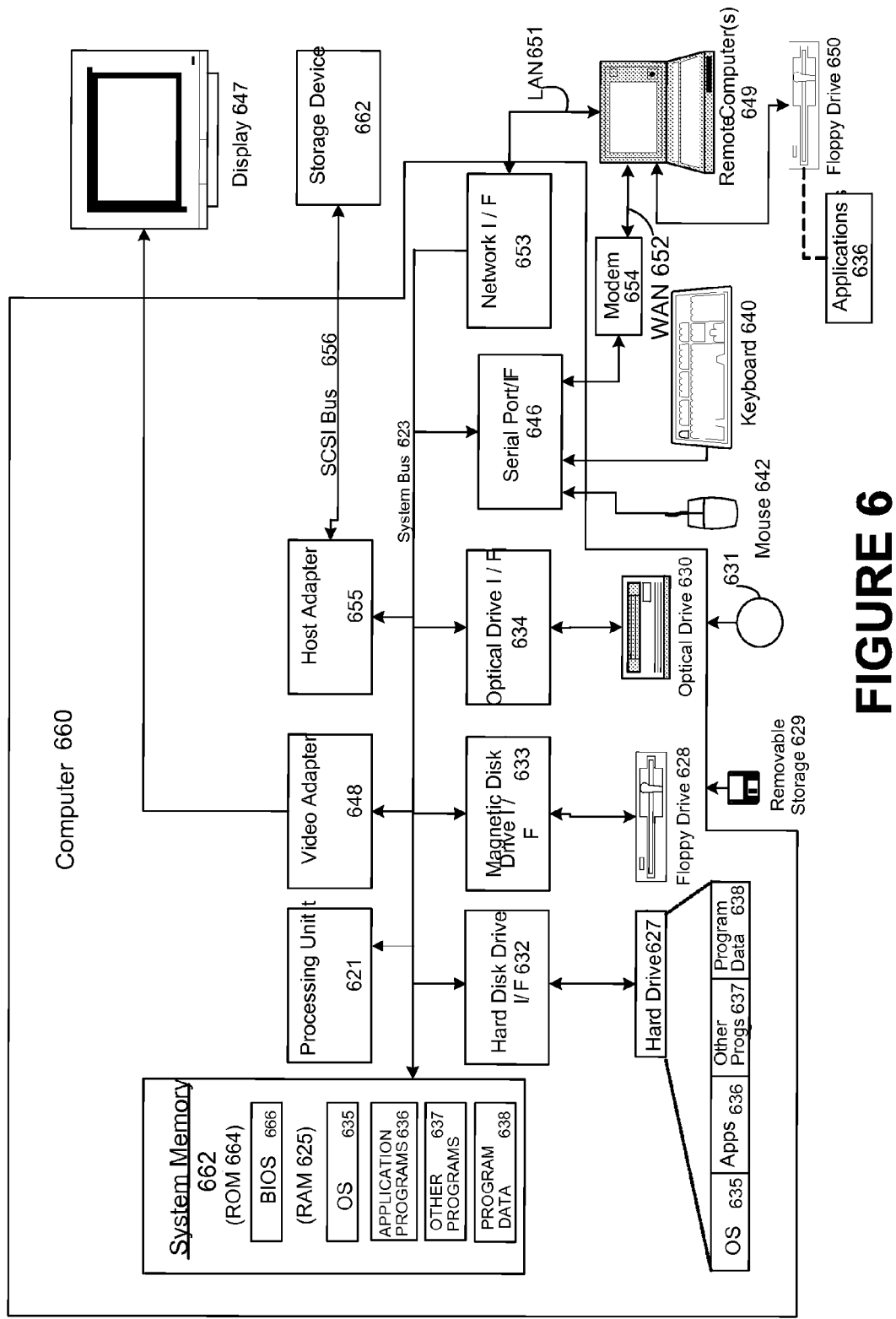
FIG. 6 is a block diagram of an exemplary computing environment in which various aspects of scalable automated empirical testing of media files on media players can be implemented.

Media tester 110 comprises at least one instance of a media tester program executed by one or more computer systems such as the generic computing system 600 shown in FIG. 6. Media crawler 125 comprises at least one instance of a media crawler program executed by one or more computer systems such as the generic computing system 600 shown in FIG. 6. In some embodiments media crawler 125 may be merged with media tester 110 in a single computer system. Media players 120 comprises a scalable number of computer systems, such as the generic computing system 600 shown in FIG. 6, or other media players capable of playing media files used for testing. For example, as shown in FIG. 1, media players 120 comprises a plurality of XBOX 360 game consoles, each with an accompanying game controller as a user interface, which is described in greater detail with regard to the exemplary game console 500 shown in FIG. 5. Media players 120 may comprise any number of media players, each of which may be the same or different. For example, in some embodiments there may be multiple banks of media players, each comprising a different version of a similar media player or entirely different media players. Accordingly, each instance of media tester 110 may be configured to communicate with a particular media player 120. Although not required, in some embodiments each media player 120 is communicatively coupled to at least one accessory input device such as a keyboard, mouse, game controller, or remote control. As will be discussed in greater detail, in some embodiments media tester 110 may utilize test hooks in such input devices in addition to or in lieu of test hooks in a base unit of media players 120 in order to simulate human interaction. Test database 135 and media file database 130 may be centralized or distributed among one or more memory devices internal or external to media crawler 125 and media tester 110.

Although interconnectivity may vary greatly among embodiments of scalable automated empirical testing of media files on media players, in the embodiment shown in FIG. 1, media tester 110 is communicatively coupled to media players 120 by communication link 136, media tester 110 is communicatively coupled to media file database 130 by communication link 137, media file database 130 is communicatively coupled to media crawler 125 by communication link 138, media crawler 125 is communicatively coupled to test database 135 by communication link 139 and test database 135 is communicatively coupled to media tester 110 by communication link 140. Each communication link 136-140 may comprise any one or a combination of the well-known communication links such as an internal bus, localized bus, private network or public network (e.g., Internet). Communication links 136-140 may comprise a single network or a combination of networks. Similarly, the type of communication on communication links 136-140 may be any of the well-known wired or wireless protocols. Those of ordinary skill in the art will recognize many interconnectivity alternatives to the one shown in FIG. 1. For example, in some embodiments communication links 138 and 140 may comprise local bus connections, communication links 137 and 139 may not exist and, instead, media tester 110 and media crawler 125 may be communicatively coupled by a communication link (not shown). Further still, the components shown in FIG. 1 may be rearranged in various embodiments of scalable automated empirical testing of media files on media players which, in turn, would rearrange or eliminate communication links 136-140. For example, in some embodiments media crawler 125 may be merged with media tester 110 in a single computer system.

Media files used for testing playback on media players 120 may be stored in media file database 130. Media files stored in media file database 130 may number in the tens, hundreds, thousands, tens of thousands or more. Media crawler 125 may catalog media files stored in media file database 130 in order to create a test wordlist. Media crawler 125 may run periodically or upon request to catalog new media files added to media file database 130. Each work item in the wordlist may contain a link to a media file in media file database 130. Each work item may also specify test parameters such as which parameters to monitor and an acceptable performance profile for one or more monitored parameters. Each work item may also further define testing such as by specifying repetitious playback on one or another specific number of media players 120.

One or more instances of media tester 110 may access the wordlist to select an item of work. The ratio of instances of media tester 110 to media players 120 may be 1:1 or any other ratio. Therefore, multiple instances of media tester 110 may be simultaneously accessing a wordlist stored in test database 135. In some embodiments, items of work may be checked out (e.g., registered) and/or randomly selected in order to avoid collisions with other instances of media tester 110 that may also be attempting to select work items. For tests requiring repetitive playback on one or more media players 120, in some embodiments there may be one work item per playback in the wordlist while other embodiments may operate in a different manner. For example, in some embodiments, work items may specify playback testing details. In some embodiments, with a single instance or multiple instances of media tester 110, media tester(s) 110 may interact with the number of media players 120 called for in the work item. In embodiments with multiple instances of media tester 110 that are able to communicate with one another, a work item requiring multiple media testers 120 may be handled by a first instance of media tester 110 queuing work items with other instances of media tester. In other embodiments, an instance of media tester 110 may generate multiple work items from a single work item, thereby updating a wordlist. In such a case, an instance of media tester 110 may assign a priority that other instances of media tester 110 are required to process in advance of other work items.

Media tester 110 may have multiple test modes. For example, a first mode may test a media file once while a second test mode may test a media file multiple times. In some embodiments, test modes may define the ratio of media testers 110 to media players 120. In one test mode the ratio may be 1:1 while in other modes it may be different. In some embodiments test modes may be modified by work items, e.g., the ratio may change in response to a work item requiring repetitive play on multiple media players 120. Multiple test modes is one way to permit dynamic scaling of the testing system. Each instance of media tester 110 may have multiple operating modes independent of other instances. In addition to or in lieu of specification in each work item, each operating mode of each instance of media tester 110 may specify test parameters and their acceptable performance profiles or further define testing such as by specifying repetitious playback on one or more media players. As further examples, in one test mode media tester 110 may randomly select work items while in others it may check out work items. In some embodiments media tester 110 may register with test database 135 when is starts testing a media file. Thus, test modes may be used for many reasons including, but not limited to, avoiding collisions, maximizing processing of work items, avoiding saturation of instances of media tester 110, avoiding unnecessary duplicative testing, etc.

While processing a work item in preparation for testing, an instance of media tester 110 may acquire and download the associated media file to one or more media players 120 in accordance with test directives specified in the work item, an operating mode, or elsewhere. One reason for repetitive testing of a media file on one or more media players 120 may be to audit previously identified failures, which may provide further insight to the cause of failures, e.g., by determining whether a failure is intermittent. In some embodiments, downloads may be performed by simulating human interaction with media players 120. For example, through test hooks in media player 120, media tester 110 may communicate the information to media player 120 that would occur if a USB memory device or other media type had been inserted into media player 120 and a media file on the USB memory device had been selected to copy and play or simply to play from the USB memory device. Similarly, media tester 110 may communicate the information to media player 120 that would occur if a user had accessed XBOX LIVE, selected the media file and downloaded it.

Following download to one or more media players 120, a media file may be played by media players 120 using simulated human interaction with media players 120. The simulated human interaction may utilize test hooks in a base unit (e.g., game console) and/or accessory unit (e.g., game controller, remote control) of media players 120. As such, simulated human interaction may be provided by media tester 110 to the base unit and/or accessory unit of media players 120. Just as a person using media players 120 to play media files would be, and in some embodiments, media tester 110 is able to control media players 120. In some embodiments, simulated human interaction with media players 120 to play media files may involve providing to media player 120 the commands and data that it would receive if a user had actually pressed a button or otherwise interacted with a user interface to media player 120 such as a game controller or remote control. For example, if a user is required to navigate a menu using an input device in order to play a media file then each step a user must take is simulated by providing commands and/or data to media player 120. In some embodiments, it may be necessary to first determine the existing state of media player 120 in order to determine how to interact with media player 120 to reach a desired state of media player 120. Once the existing and desired states are known, media tester 110 may provide information, i.e., commands and/or data, to media player 120 to navigate from the existing state to the desired state. Repetitious play may involve other variations of simulated human interaction in order to test aspects of media players 120 and/or media file that may not be tested by other simulated human interaction.

While a media file is being played by media player 120, playback performance may be monitored, analyzed and reported in accordance with test directives specified in the work item, operating mode, or elsewhere. As well, in some embodiments, parameters and performance profiles may be fixed in media tester 110. However defined, the specific parameters to be monitored and their acceptable performance profiles are used to define the scope of monitoring and to identify failures. Utilizing test hooks in media players 120, media players 120 provide information about monitored parameters. The information is tested against performance profiles to identify failures. Some examples of failures may include: (a) dropped frames, such as when samples in a media file are being discarded because media player 120 cannot keep up; (b) graphics completion events, e.g., Direct 3D Swap or D3D Present, exceeding frame rate, e.g., 16.67 mS at 60 Hz; (c) CPU core saturation; (d) playback exceeds length of media file, which may indicate a playback slowdown, temporary lockup/soft hang or a permanent lock up/crash. Such failures may be listed in a test report.

Test reports reporting the results of playback performance monitoring may be stored, for example, in test database 135. Test reports may be accompanied by instructions to reproduce failures. They may also cross-reference each failure to content in media files as well as the source code of the application running on media player 120 that played the media file when the failure occurred. Information about a failure may be reported based on whether a failure is known. New failures may be treated differently from known failures in terms of the amount of information provided in a report and whether and to what extent to any files should accompany the report such as a call stack, debug spew and/or dump file providing the contents of memory when the failure was encountered. Such additional files may be most useful to debug crashes.

Failures may be analyzed before and/or after generation of test reports. If analyzed prior to the generation of a report then analyses may be incorporated therein. Failures may be analyzed to categorize, rank, prioritize or assign them to a review team or otherwise render a judgment pertaining to the failures. Such analyses may also access additional information from test database 135 concerning, for example, previous test results in order to determine whether a failure is known or new. Combining previous test results with new test results may allow additional analyses. As previously noted, known failures may lead to less data logging. Additionally, as previously noted, failures may be audited by additional work items for follow-up testing. In some embodiments, failures may automatically generate additional work items for auditing. In some embodiments, the type of failure (e.g., its category, rank or priority) may dictate the details of automated follow-up testing such as the test parameters, performance profiles, number of tests and the number of media players involved in the follow-up testing. Such follow-up testing may help determine whether a failure is persistent, intermittent or an anomaly. Upon completing a test, an instance of media tester 110 may continue with such follow-up testing or may recontact a test database 135 to select a new work item.

Irrespective of the timing of a failure audit immediately after the test identifying the failure or at subsequent time, as where additional work item(s) is (are) automatically generated from the failure or manually generated upon review and routinely selected from the wordlist by media tester 110, a failure audit may comprise running the same media file multiple times on one or more media players 120 using the same or different testing parameters, performance profiles and simulated human interaction relative to the original test. The auditing tests may be carried out in a similar procedure, e.g., providing the media file to one or more media players 120, simulating human interaction with each media player 120, playing the media file on each media player 120, monitoring each media player 120 during playback of the media file, reporting playback performance, including any failures that occur, during playback of the media file on each media player 120 and perhaps analyzing and/or auditing any failures. To avoid using the same media player(s) 120 for auditing, media players 120 used to audit a failure may be randomly selected.

Test reports may be reviewed by one or more people or teams. In embodiments where a list of review teams and logic to assign failures to them are known, media tester 110 may assign failures to particular review teams. For example, review teams may be selected by failure priority, failure category, software build of media player 120, and/or other facts. For example, a crash failure may be assigned directly to a development team without first involving a quality assurance team, which may avoid unnecessary delay and expense. Media tester 110 may be distributed to media player 110 and media file developers to see failures reproduced firsthand.

In addition to media files, scalable automated empirical testing of media files on media players applies equally well to media applications such as video games. However, media applications may require more extensive simulated human interaction with media players 120 to empirically test playback. Work items for media applications such as games requiring constant interaction to play may be accompanied by supporting files used during testing to simulate human interaction with an input device such as a game controller or remote control. Performance monitoring of media applications may be carried out in the same manner as with media files, although failure reports may cross-reference failures to source code in media applications.

Figure 2:
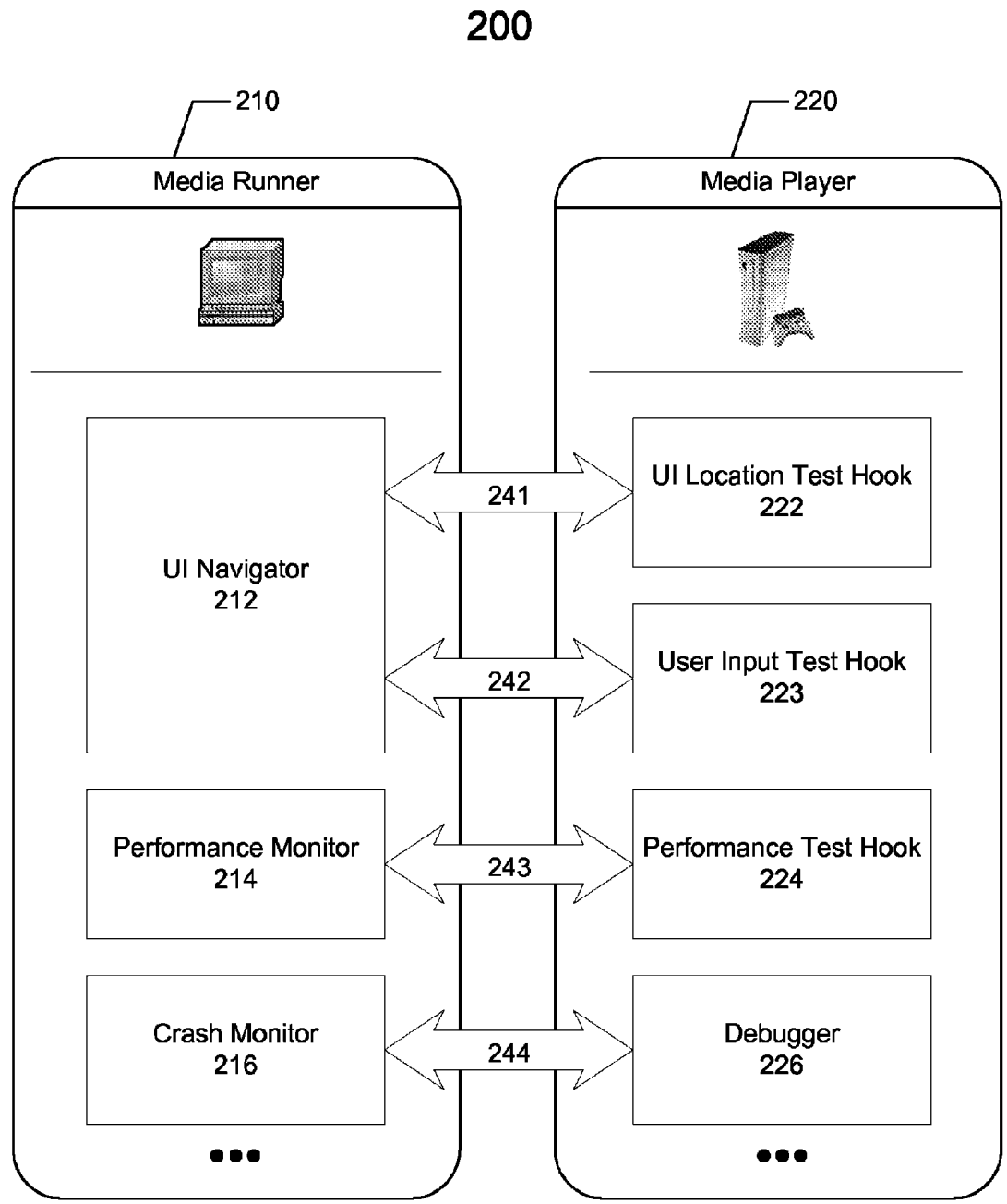
FIG. 2 illustrates exemplary configurations of and interface between a media player and media tester

FIG. 2 illustrates exemplary configurations of and interface between a media player and media tester in accordance with an aspect of scalable automated empirical testing of media files on media players. As indicated in FIG. 2, numerous components have been simplified or omitted from FIG. 2 in order to focus on selected features of scalable automated empirical testing of media files on media players. For example, a controller portion of media tester 210 utilized to select work items and acquire media files is not shown in order to focus on exemplary communication between media tester 210 and media player 220. Further, exemplary components in FIG. 2 may be merged or otherwise rearranged in other embodiments of scalable automated empirical testing of media files on media players. In the embodiment shown in FIG. 2, exemplary test configuration 200 comprises media tester 210 and media tester 220 as generally described in the discussion of FIG. 1. Influencing the design of various embodiments of scalable automated empirical testing of media files on media players is a primary objective of empirical testing to closely approximate actual use of media player 220. Media tester 210 comprises user interface ("UI") navigator 212, performance monitor 214 and crash monitor 216. Media player 220 comprises UI location test hook 222, user input test hook 223, performance test hook 224 and debugger 226. UI navigator 212 is communicatively coupled to UI location test hook 222 by communication link 241. UI navigator 212 is also communicatively coupled to at least one user input test hook 223 by communication link 242. Performance monitor 214 is communicatively coupled to performance test hook 224 by communication link 243. Crash monitor 216 is communicatively coupled to debugger 226 by communication link 244.

Having downloaded a media file to media player 220, media tester 210 begins by finding out the existing state of the menu system of media player 220. This may be done, for example, through communication between UI navigator 212 and UI location test hook 222, which will be discussed in greater detail with regard to FIG. 3. After the existing state of the menu system of media player 220 has been determined, UI navigator 212 can begin to move through the menu system to a desired state to play the media file, an example of which is shown in FIG. 4. This may be done, for example, through communication between UI navigator 212 and user input test hook 223 that simulates human interaction with at least one user input to media player 220. As previously noted, there may be one or more user input test hooks 223 in the base unit (e.g., game console) or accessory (e.g., game controller, remote control) of media player 220. User input test hooks 223 permit simulated human interaction with one or more user inputs. User inputs may comprise, for example, any one or more of the wide variety of ways that a human can interact with the base unit or accessory to media player 220 through human interface elements, such as buttons, pads, paddles, pedals and directional devices including, but not limited to, directional pads, joysticks and wheels.

During playback of the media file, performance monitor 214 monitors selected information provided through performance test hook 224. Selected information provided through performance test hook 224 may include, for example, video frame processing, graphics completion events, CPU saturation and playback time. The information is tested against performance profiles to identify failures. Some examples of failures may include: (a) dropped frames, such as when samples in a media file are being discarded because media player 120 cannot keep up; (b) graphics completion events, e.g., Direct 3D Swap or D3D Present, exceeding frame rate, e.g., 16.67 mS at 60 Hz; (c) CPU core saturation; (d) playback exceeds length of media file, which may indicate a playback slowdown, temporary lockup/soft hang or a permanent lock up/crash. As previously discussed, such failures may be listed in a test report. Failures logged in the test report may include instructions on how to reproduce the failures accompanied by the locations in the media file where the failures were encountered during playback. Performance monitor 214 may also analyze failures, assign one or more review teams and instigate auditing of the failures, as previously discussed with regard to FIG. 1. Basic failures may first be processed by a quality assurance team to further rank or prioritize failures depending on their impact on customers. A development team may be assigned more serious priority failures without delay.

Crash monitor 216 watches for catastrophic type failures by monitoring information provided through debugger 226. Upon a crash, in some embodiments crash monitor 216 may log all information logged by performance monitor 214 plus pertinent information useful to developers to diagnose and solve such catastrophic failures. In some embodiments, crash monitor 216 may consult test database 135 to determine whether a crash failure is known or not. If the crash failure is new then, in some embodiments, the full contents of memory in media player 220 are saved into a full dump file that can be available along with the test report on test database 135. A developer may load the dump file into Visual Studio or a similar debugging tool to help diagnose the crash failure. Crash monitor 216 may also cross reference a crash failure the source code of the application running on media player 220 that was playing the media file. Crash monitor 216 may also log in the test report where the crash occurred in the media file along with the call stack of the crash and pertinent contents of debugger 226. In situations where a crash failure is known, reduced failure logging may be performed by crash monitor 216 so long as the results can be audited and reproduced. Reduced logging for known failures may comprise saving a mini-dump file instead of a full dump file. Crash failures may be logged as code defect bugs and automatically assigned to a development team without quality assurance team review, which saves time and expense.

As shown, monitoring happens in the same end-to-end environment used by consumers rather than in a disjointed or separate test harness. An example of why this is a superior method of testing pertains to the interaction between media playback and the user interface of media player 220. There are failure situations where performance monitor 214 and crash monitor 216 report success because a media file played back fine even though information was not properly communicated to the user interface causing media player 220 to lock up. In embodiments of scalable automated empirical testing of media files on media players, UI navigator 212 can accurately log this scenario as a failure.

Figure 3:
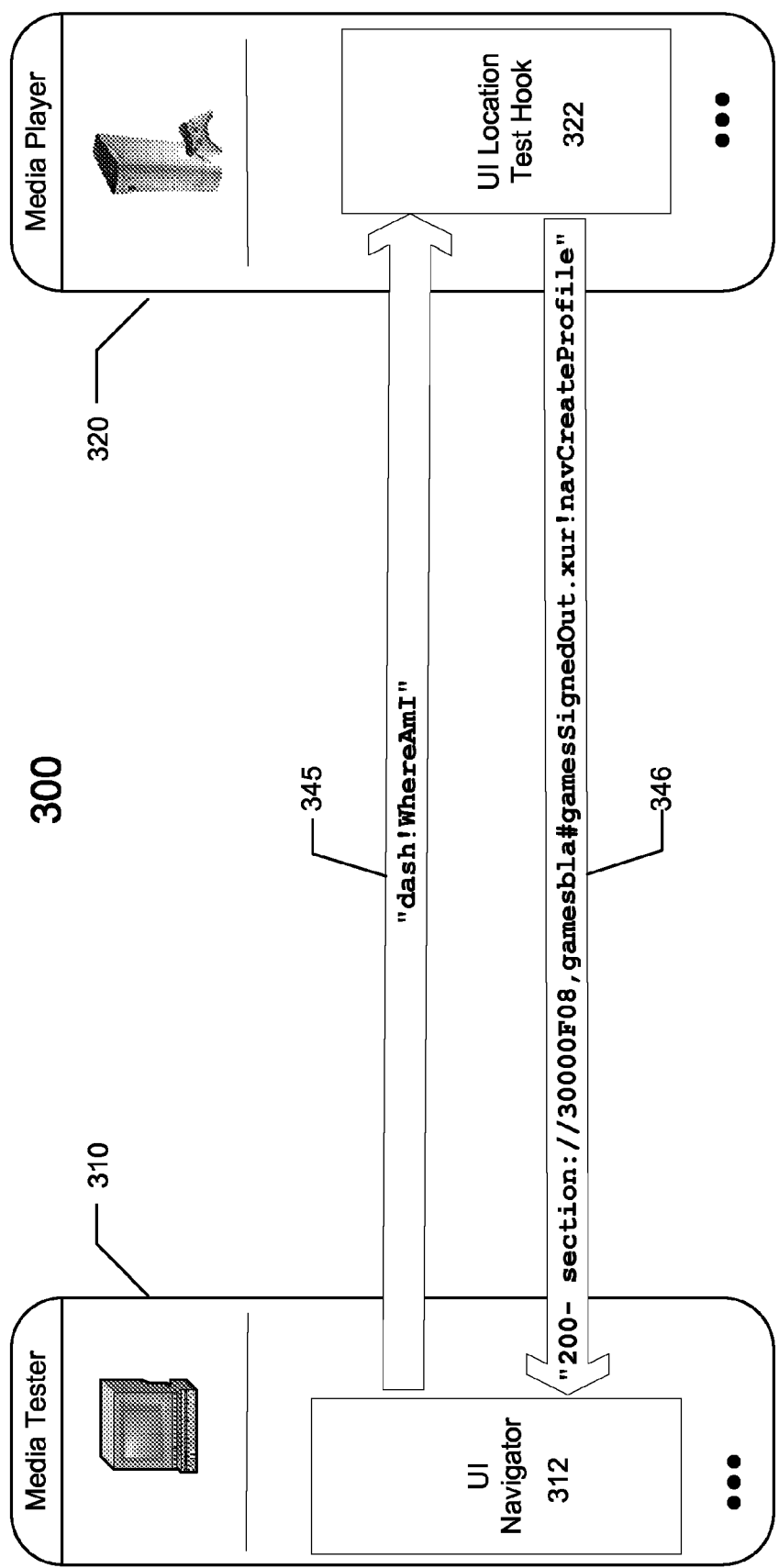
FIG. 3 illustrates an exemplary communication between media player and media tester.
Figure 4:
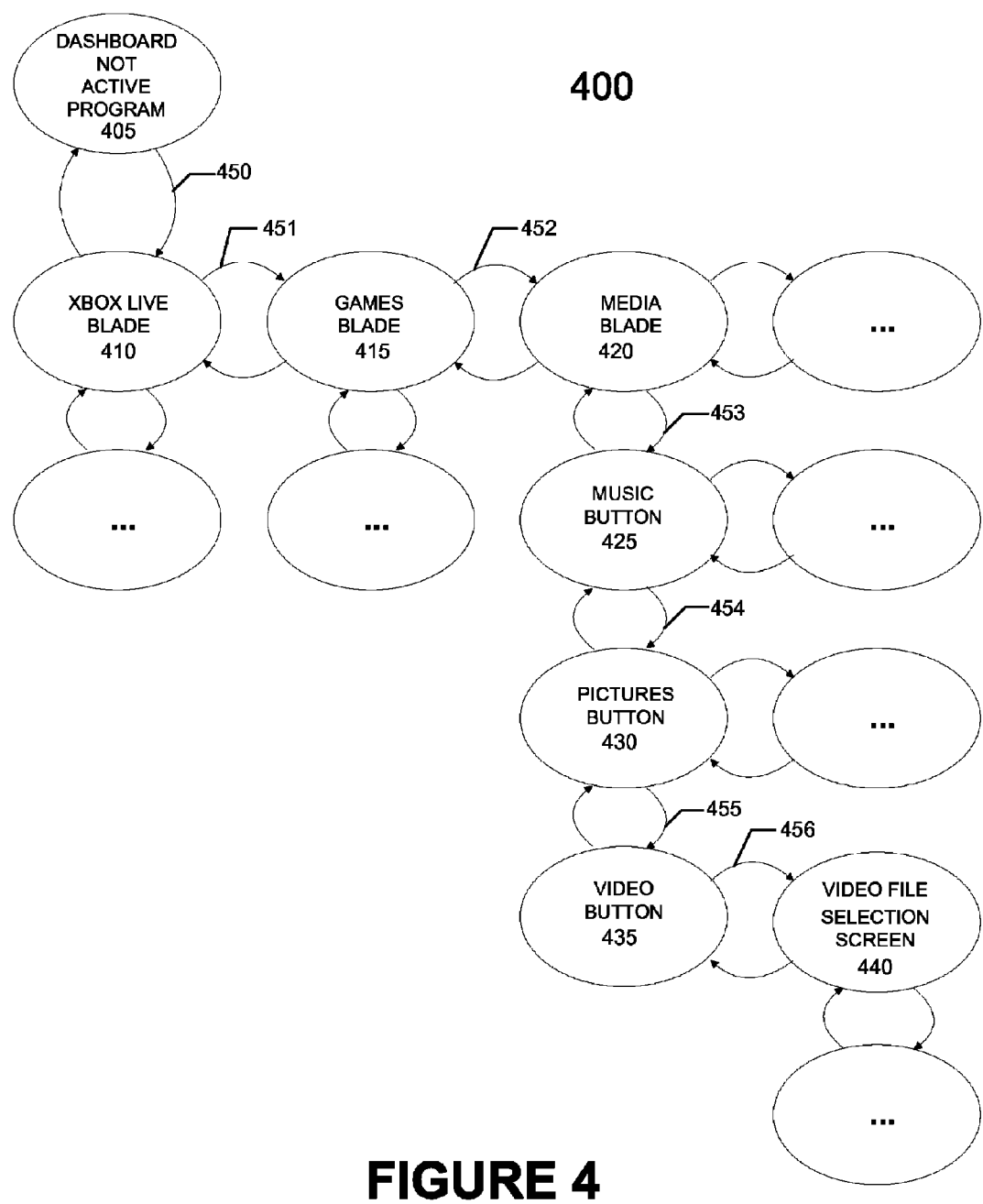
FIG. 4 illustrates an exemplary navigation through a menu system.

FIG. 3 illustrates an exemplary communication between media player and media tester in accordance with an aspect of scalable automated empirical testing of media files on media players. Unless always beginning from a known location, such as following a reset, in order to navigate the menu system in media player 320, UI navigator 312 must identify the menu system its existing state in media player 320. In order to determine the existing state of the menu system, UI navigator 316 may send a command to UI location test hook 326 requiring media player 320 to identify the existing state of the menu system. Command inquiry 345 may be formatted as shown in FIG. 3, "dash!WhereAmI." The portion of the command "dash," as in the XBOX graphical user interface known as Dashboard, identifies the menu system process or program. The portion of the command "WhereAmI" identifies the inquiry made to the menu system process or program. UI location test hook 326 issues a response 346 to command inquiry 345, which is provided to UI navigator 316. Response 346 may be formatted as in shown FIG. 3, "200-section://30000F08, gamesbla#gamesSignedOut.xur!navCreateProfile." The portion of response 346 "200-section://30000F08, gamesbla#gamesSignedOut.xur" comprises a string identifying the active menu screen output by media player 320 to a display viewed by a user. The portion of response 346, "navCreateProfile" identifies the user input (e.g., button) currently highlighted in the user interface (e.g., game controller, remote control). Although response 346 is shown as one string, a response by UI location test hook 322 may comprise one or more strings. UI navigator 312 compares response 346 to a map of the menu system of media player 320 in order to determine how to proceed to a desired state in the menu system to play the media file downloaded to media player 320. UI navigator 312 navigates to a desired state by issuing commands to user input test hook 223 and issuing command inquiries to UI location test hook 222 to ensure that media player 220 responds appropriately to the simulated user inputs.

FIG. 4 illustrates an exemplary navigation through a menu system in accordance with an aspect of scalable automated empirical testing of media files on media players. In the embodiment shown in FIG. 4, menu system 400 illustrates a portion of the XBOX 360 Dashboard, which is the graphical user interface of the XBOX 360. The Dashboard serves as the control center for the XBOX 360 video game and entertainment system. The Dashboard comprises five "blades" or tabs that can be selected by users to flip between menu screens. The five menu screens are XBOX LIVE, Games, Media, Marketplace (not shown) and System (not shown). If inactive, the Dashboard can be activated in various ways, including by selecting an XBOX Guide button on a game pad, also known as a D-pad (i.e. directional pad), or the left stick of a game controller. The XBOX LIVE Blade menu allows users to, among other things, enter XBOX LIVE. The Games Blade menu allows users to, among other things, access their collection of games. The Media Blade menu allows users to, among other things, download and play live and recorded music, videos, movies, television shows, view pictures and slideshows, and create play lists from many sources internal and external to the XBOX 360. The Marketplace Blade menu allows users to, among other things, download movies, television shows, trailers, demonstrations, short films, game themes and pictures. The System Blade menu allows users to, among other things, edit XBOX 360 console playback settings, manage a connection to a computer, network or XBOX LIVE, and manage memory such as an XBOX 360 hard drive.

The portion of the XBOX 360 Dashboard shown in FIG. 4 illustrates an exemplary navigation path, i.e., from existing state dashboard not active program 405 through XBOX LIVE blade 410, games blade 415, media blade 420, music button 425, pictures button 430 and video button 435 to desired state video file selection screen 440. Each bubble represents a state of menu system 400. As shown in FIG. 4, the existing state is dashboard not active program 405. With knowledge of menu system 400 and its existing state acquired as shown in FIG. 3, for example, UI navigator 312 may issue state to state transition commands to user input test hook 223 to navigate to the desired state, e.g., video file selection screen 440. As shown in FIG. 4, UI navigator 212 issues seven transition commands 450-456 to navigate from dashboard not active program 405 to video file selection screen 440. Transition commands may be extendable. Each transition 450-456 may simulate one or more simulated human inputs. For example, transition command 450 from dashboard not active program 405 to XBOX LIVE blade 410 may simulate a user pressing a sequence of buttons to bring up the system blade menu (not shown) and load the Dashboard program. Other transitions, e.g., transitions 451-456, may simulate a user pressing the Right, Down or "A" buttons on an XBOX 360 game pad (not shown). In some embodiments, UI navigator 212 may inquire after each transition command 450-456 about the existing state of menu system 400 by, for example, issuing command inquiry 345 to UI location test hook 322. In some embodiments, if response 346 indicates the existing state is as expected or further along in the path then navigation continues without logging any failure. If response 346 indicates the existing state is not on the expected path then UI navigator 212 may log a failure and derive a new path to the desired state. In some embodiments, following a failure, media tester 210 may increase monitoring or testing, which may mean more slowly traversing menu system 400 or navigating multiple paths through menu system 400. Deriving new paths through menu system 400 permits media tester 210 to overcome obstacles such as the presence or absence of optional states, response to user button presses/holds, atomicity of menu navigation and connectivity issues with media player 220.

UI Navigator 212 manipulates media player 220 just as a user is able to do. Where a media file being tested is a video, for example, UI navigator 212 navigates to a state to select and play the video, e.g., video file selection screen 440. UI navigator 312 may issue other commands in accordance with test specifications. For example, in addition to issuing commands to play a media file, UI navigator 312 may also issue commands to pause, stop, forward, rewind, etc. to exercise all or selected portions of media file content and code paths in media player 220.

Exemplary Consumer Devices and Platform for Media Tester and Media Crawler

Without limitation, FIG. 5 is a block diagram of an exemplary game console in which various aspects of scalable automated empirical testing of media files on media players can be implemented. An exemplary consumer device comprises, for example, a game console, such as an XBOX 360 game console, desktop, laptop, handheld or other computer, cellular telephone or any other media playback device. FIG. 6 provides a block diagram of an exemplary computing environment as a representative consumer device and as a suitable platform on which media tester and/or media crawler may operate.

FIG. 5 is a block diagram of an exemplary consumer device that can playback media files. Consumer device, i.e., game console, 500 comprises hardware, firmware and software. Game console 500 executes game applications and plays media files (not shown). For purposes of simplicity, not all components or interconnectivity are shown and some components have been merged in exemplary game console 500.

Game console 500 comprises central processing unit (CPU) 501, which has level 1 (L1) cache 502, level 2 (L2) cache 504, and ROM (Read-Only Memory) 506. Level 1 and Level 2 cache 502, 504 temporarily store executable instructions and/or data, thereby improving processing speed and throughput. ROM 506 may store basic executable instructions (i.e. firmware) that are loaded during an initial phase of a boot process when the game console 500 is initially powered. Alternatively, the executable code that is loaded during the initial boot phase can be stored in another type of non-volatile memory. ROM 506, or the alternative non-volatile memory need not be embedded within CPU 501. Game console 500 may optionally be a multi-processor system. For example, game console 500 may have three processors 501, 503, and 505, where processors 503 and 505, which may be similar or dissimilar to processor 501. CPU's 501, 503 and 503 may share cache memory (not shown).

Game console 500 further comprises graphics processing unit (GPU) 508, which is coupled to CPU 501, and any additional processors such as CPUs 503, 505, by a bus. GPU 508 is also coupled by one or more busses each to memory controller 510, I/O (input/output) hub 518 and video codec (coder/decoder) 514. Memory controller 510 and video codec 514 may form part of GPU 508. GPU 508, in addition to video processing functionality, may comprise functionality commonly referred to as Northbridge. Northbridge functionality generally comprises a high speed memory and video hub having a memory controller and a video controller. In exemplary game console 500, both CPU 501 and I/O hub (Southbridge) 518 access memory 512 through Northbridge functionality in GPU 508. Memory controller 510 facilitates access to various types of memory 512, which may be RAM (Random Access Memory) or other variety of memory.

GPU 508 and video codec 514 together form a video processing pipeline for high speed, high resolution graphics processing required by many game applications. Data is carried from GPU 508 to/from video codec 514 via a bi-directional bus. This video processing pipeline outputs data to A/V (audio/video) port 540 for transmission to a television or other video display device (not shown). Game console 500 may have its own integrated display. Not shown is a digital to analog converter (DAC) that may be coupled between video codec 514 and A/V port 540.

Game console 500 further comprises I/O hub 518, which may comprise, among other functionality, functionality commonly referred to as Southbridge. Southbridge functionality generally performs and controls functions that are relatively slow compared to functions performed and controlled by Northbridge. I/O hub 518 comprises I/O controller 520, system management controller 522, audio processing unit 523, network interface controller 524, USB host controllers 526, 528 and front panel I/O subassembly 530. USB controllers 526, 528 serve as hosts for peripheral controllers 542(1), 542(2), wireless adapter 548, and memory unit 546 (e.g., flash memory, CD/DVD ROM, hard drive, other removable media). Network interface 524 and/or wireless adapter 548 provide access to a network (e.g., local area network (LAN), Internet) and may be any of a wide variety of various wired or wireless interface components including an Ethernet card, modem, Bluetooth module, and the like.

System memory 543 may store application data that is loaded during the boot process. Media drive 544 may comprise, for example, a DVD/CD drive, hard drive or other fixed or removable media reader and/or writer. Game application data may be read from and/or written to media via media drive 544 for execution, playback, etc. by game console 500. Media drive 544 is connected to I/O controller 520 via a bus, such as a Serial ATA bus or other high speed connection (e.g., IEEE 5394). Game console 500 may include hard disk 552, which may be used, for example, to store an operating system, game applications, game data or other types of data.

System management controller 522 provides a variety of service functions for game console 500. Audio processing unit 523 and audio codec 532 form a corresponding audio processing pipeline that may provide, for example, high fidelity, 5.1 Dolby Digital, 3D, and stereo audio processing of sounds produced by, for example, a game application. Audio data is carried between audio processing unit 523 and audio codec 532 via a communication link. The audio processing pipeline outputs audio data to A/V port 540 for implementation by a device having audio capabilities.

Front panel I/O subassembly 530 supports the functionality of various controls such as power button 550 and eject button 552, as well as any LEDs (light emitting diodes) or other indicators exposed on the outer surface of game console 500. System power supply module 536 provides power to components of game console 500 while fan 538 cools them.

CPU 501, GPU 508, memory controller 510, and various other components within game console 500 are interconnected via one or more buses, including serial and parallel buses, a memory bus, a peripheral bus, and a processor or local bus using any of a variety of bus architectures. As previously noted, not all buses or other connections are shown in FIG. 4.

When game console 500 is powered on or rebooted, application data and/or instructions can be loaded from system memory 543, media drive 544, hard disc 553 or other memory into memory 512 and/or caches 502, 504 and executed on the CPU 501. The game application being executed may present a graphical user interface that provides a consistent user experience when navigating to different media types available on or to game console 500. Instructions and/or data accessible via media drive 544, system memory 543, hard disk 553 or other memory may be launched, played or otherwise accessed from these various sources to provide additional functionality to game console 500.

Game console 500 may be operated as a standalone system by connecting the system to a television or other display. As previously noted, game console 500 may have an integrated display. In this stand alone mode, game console 500 may allow one or more users to interact with the system, watch movies, listen to music, play games and the like. Network interface 524 or wireless adapter 548 may allow game console 500 to be operated as a participant in a local or wide area network community.

FIG. 6 is a block diagram of an exemplary computing environment in which various aspects of scalable automated empirical testing of media files on media players can be implemented. For example, the exemplary computing environment shown in FIG. 6 illustrates and exemplary media player as well as a suitable computing environment in which scalable automated empirical testing of media files on media players or portion of it such as media tester program and/or media crawler program can be implemented. Although not required, various aspects of media tester and media crawler can be described in the general context of computer executable instructions, such as program modules, being executed by a computer, such as a personal computer, client workstation or a server. Generally, program modules include routines, programs, objects, components, data structures and the like that perform particular tasks or implement particular abstract data types. Moreover, implementation of media tester and media crawler can be practiced with other computer system configurations, including hand held devices, multi processor systems, microprocessor based or programmable consumer electronics, network PCs, minicomputers, mainframe computers, and the like. Further, media tester and media crawler also can be practiced in distributed computing environments where tasks are performed by remote processing devices that are linked through a communications network. In a distributed computing environment, program modules can be located in both local and remote memory storage devices.

A computer system can be roughly divided into three component groups: the hardware component, the hardware/software interface system component, and the application programs component (also referred to as the "user component" or "software component"). In various embodiments of a computer system the hardware component may comprise central processing unit (CPU) 621, memory (both ROM 664 and RAM 625), basic input/output system (BIOS) 666, and various input/output (I/O) devices such as keyboard 640, mouse 662, display 645, and/or printer (not shown), among other components. The hardware component comprises the basic physical infrastructure for the computer system.

The application programs component comprises various software programs including but not limited to compilers, database systems, word processors, business programs, video games, and so forth. Application programs provide the means by which computer resources are utilized to solve problems, provide solutions, and process data for various users (machines, other computer systems, and/or end-users). In an example embodiment, application programs perform the functions associated with media tester and media crawler as described above.

The hardware/software interface system component comprises (and, in some embodiments, may solely consist of) an operating system that itself comprises, in most cases, a shell and a kernel. An "operating system" (OS) is a special program that acts as an intermediary between application programs and computer hardware. The hardware/software interface system component may also comprise a virtual machine manager (VMM), a Common Language Runtime (CLR) or its functional equivalent, a Java Virtual Machine (JVM) or its functional equivalent, or other such software components in the place of or in addition to the operating system in a computer system. A purpose of a hardware/software interface system is to provide an environment in which a user can execute application programs.

The hardware/software interface system is generally loaded into a computer system at startup and thereafter manages all of the application programs in the computer system. The application programs interact with the hardware/software interface system by requesting services via an application program interface (API). Some application programs enable end-users to interact with the hardware/software interface system via a user interface such as a command language or a graphical user interface (GUI).

A hardware/software interface system traditionally performs a variety of services for applications. In a multitasking hardware/software interface system where multiple programs may be running at the same time, the hardware/software interface system determines which applications should run in what order and how much time should be allowed for each application before switching to another application for a turn. The hardware/software interface system also manages the sharing of internal memory among multiple applications, and handles input and output to and from attached hardware devices such as hard disks, printers, and dial-up ports. The hardware/software interface system also sends messages to each application (and, in certain case, to the end-user) regarding the status of operations and any errors that may have occurred. The hardware/software interface system can also offload the management of batch jobs (e.g., printing) so that the initiating application is freed from this work and can resume other processing and/or operations. On computers that can provide parallel processing, a hardware/software interface system also manages dividing a program so that it runs on more than one processor at a time.

A hardware/software interface system shell (referred to as a "shell") is an interactive end-user interface to a hardware/software interface system. (A shell may also be referred to as a "command interpreter" or, in an operating system, as an "operating system shell"). A shell is the outer layer of a hardware/software interface system that is directly accessible by application programs and/or end-users. In contrast to a shell, a kernel is a hardware/software interface system's innermost layer that interacts directly with the hardware components.

As shown in FIG. 6, an exemplary general purpose computing system in which scalable automated empirical testing of media files on media players may be implemented includes a conventional computing device 660 or the like, including a processing unit 621, a system memory 662, and a system bus 623 that couples various system components including the system memory to the processing unit 621. Processing unit 621 may comprise, for example, a CPU, Northbridge and Southbridge chipset, among other components. The system bus 623 may be any of several types of bus structures including a memory bus or memory controller, a peripheral bus, and a local bus using any of a variety of bus architectures. The system memory includes read only memory (ROM) 664 and random access memory (RAM) 625. A basic input/output system 666 (BIOS), containing basic routines that help to transfer information between elements within the computing device 660, such as during start up, is stored in ROM 664. The computing device 660 may further include a hard disk drive 625 for reading from and writing to a hard disk (not shown), a magnetic disk drive 628 (e.g., floppy drive) for reading from or writing to a removable magnetic disk 629 (e.g., floppy disk), and an optical disk drive 630 for reading from or writing to a removable optical disk 631 such as a CD ROM or other optical media. The hard disk drive 625, magnetic disk drive 628, and optical disk drive 630 are connected to the system bus 623 by a hard disk drive interface 632, a magnetic disk drive interface 633, and an optical drive interface 634, respectively. The drives and their associated computer readable media provide non volatile storage of computer executable instructions, data structures, program modules and other data for the computing device 660. Although the exemplary environment described herein employs a hard disk, a removable magnetic disk 629, and a removable optical disk 631, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like may also be used in the exemplary operating environment. Likewise, the exemplary environment may also include many types of monitoring devices such as heat sensors and security or fire alarm systems, and other sources of information.

A number of program modules comprising computer-executable instructions can be stored on any one or more computer-readable mediums such as the hard disk, magnetic disk 629, optical disk 631, ROM 664, or RAM 625, including an operating system 635, one or more application programs 636, other program modules 635, and program data 638. A user may enter commands and information into the computing device 660 through input devices such as a keyboard 640 and pointing device 662 (e.g., mouse). Other input devices (not shown) may include a microphone, joystick, game pad, satellite disk, scanner, or the like. These and other input devices are often connected to the processing unit 621 through a serial port interface 646 that is coupled to the system bus, but may be connected by other interfaces, such as a parallel port, game port, or universal serial bus (USB). Aside from mouse 642, keyboard 640 and modem 654, serial port I/F 646 may also be connected to a wireless communications device (not shown). A display 645 or other type of display device is also connected to the system bus 623 via an interface, such as a video adapter 648. In addition to display 645, computing devices typically include other peripheral output devices (not shown), such as speakers and printers. The exemplary environment of FIG. 6 also includes a host adapter 655, Small Computer System Interface (SCSI) bus 656, and an external storage device 662 connected to the SCSI bus 656.

The computing device 660 may operate in a networked environment using logical connections to one or more remote computers, such as a remote computer 649. The remote computer 649 may be another computing device (e.g., personal computer), a server, a router, a network PC, a peer device, or other common network node, and typically includes many or all of the elements described above relative to the computing device 660, although only a memory storage device 650 (floppy drive) has been illustrated in FIG. 6. The logical connections depicted in FIG. 6 include a local area network (LAN) 651 and a wide area network (WAN) 652. Such networking environments are commonplace in offices, enterprise wide computer networks, intranets and the Internet.

When used in a LAN networking environment, the computing device 660 is connected to the LAN 651 through a network interface or adapter 653. When used in a WAN networking environment, the computing device 660 can include a modem 654 or other means for establishing communications over the wide area network 652, such as the Internet. The modem 654, which may be internal or external, is connected to the system bus 623 via the serial port interface 646. In a networked environment, program modules depicted relative to the computing device 660, or portions thereof, may be stored in the remote memory storage device. It will be appreciated that the network connections shown are exemplary and other means of establishing a communications link between the computers may be used.

While it is envisioned that numerous embodiments of scalable automated empirical testing of media files on media players are particularly well-suited for computerized systems, nothing in this document is intended to limit scalable automated empirical testing of media files on media players to such embodiments. On the contrary, as used herein the term "computer system" is intended to encompass any and all devices capable of storing and processing information and/or capable of using the stored information to control the behavior or execution of the device itself, regardless of whether such devices are electronic, mechanical, logical, or virtual in nature.

The functionality described herein can be implemented in connection with hardware or software or, where appropriate, with a combination of both. Thus, the methods, apparatuses and systems for scalable automated empirical testing of media files on media players, or certain aspects or portions thereof such as media tester 110 and media crawler 125, can take the form of program code (i.e., instructions) and/or data embodied in tangible computer readable media, such as floppy diskettes, CD-ROMs, hard drives, or any other machine-readable storage medium, wherein, when the program code or data is loaded into and executed or read by a machine, such as a computer, the machine becomes an apparatus for implementing scalable automated empirical testing of media files on media players.

The program(s) can be implemented in assembly or machine language, if desired. In any case, the language can be a compiled or interpreted language, and combined with hardware implementations. The methods and apparatuses for implementing scalable automated empirical testing of media files on media players also can be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like. When implemented on a general-purpose processor, the program code combines with the processor to provide a unique apparatus that operates to invoke the functionality of media tester and media crawler. Additionally, any storage techniques used in connection with media tester and media crawler can invariably be a combination of hardware and software.

Empirical testing offers very useful real-world feedback because testing closely follows scenarios that customers follow while playing media files or media applications. Automated empirical testing navigates the same user interface, triggers the same code paths on the same hardware and results in the same memory footprints experienced by media players used by customers. As such, empirical test results are more realistic and useful than emulation test results. A scalable empirical testing system with ones, tens, hundreds or more media players operating 24 hours per day 365 days per year permits content providers to process large volumes of media files in short periods of time, which permits greater flexibility in making software improvements to media players and offers greater quality assurance in media files. A scalable empirical testing system permits testing throughout development and production of hardware and software builds of media players. A scalable empirical testing system also removes the burden of testing from customers, increases the level of confidence customers have in downloaded content and, ultimately, improves the quality reputation of content service providers having such a system.

While scalable automated empirical testing of media files on media players has been described in connection with the example embodiments of the various figures, it is to be understood that other similar embodiments can be used or modifications and additions can be made to the described embodiments for performing the same functions of scalable automated empirical testing of media files on media players without deviating there from. Therefore, scalable automated empirical testing of media files on media players as described herein should not be limited to any single embodiment, but rather should be construed in breadth and scope in accordance with the appended claims.

What is claimed:

1. A method, executable by a processor, of empirical automated testing of media files that are playable in one or more media players, comprising:

storing in a media file database, a first media file that is playable in the one or more media players;

providing in a first media player a first test hook configured to interact with a media tester via commands and responses, the commands and responses comprising one or more strings;

activating the media tester to retrieve the first media file from the media file database;

downloading from the media tester to the first media player, the first media file for testing accurate playback of the first media file in the first media player;

performing automated testing of the first media file in the first media player by simulating human interaction, wherein simulating human interaction comprises:

sending from the media tester, via a communication network, at least one command to the first media player that simulates at least one human input, the at least one command comprising a first string; and transmitting from the first media player to the media tester, via the communication network, a response to the at least one command, the response comprising a second string generated by the first test hook upon monitoring of at least one state of the first media player, the at least one state associated with a test procedure directed at identifying defects during playback of the first media file in the first media player.

2. The method in accordance with claim 1, further comprising:

cataloging media files stored in the media file database to create a wordlist; and randomly selecting from the wordlist, a first work item linked to the first media file.

3. The method in accordance with claim 2, the method further comprising:

determining from the first work item how many media players will test the first media file.

4. The method in accordance with claim 1, wherein monitoring of the at least one state of the first media player comprises evaluating failures by categorizing, ranking, prioritizing, assigning or otherwise rendering a judgment pertaining to the failures.

5. The method in accordance with claim 2, the method further comprising:

generating a second work item based on a failure during playback of the first media file.

6. The method in accordance with claim 1, the method further comprising:

auditing a failure by providing the first media file to a plurality of media players;

simulating human interaction with each of the plurality of media players;

playing the first media file on each of the plurality of media players;

monitoring each of the plurality of media players during playback of the first media file; and reporting performance, including any failures that occur, during playback of the first media file on each of the plurality of media players.

7. The method in accordance with claim 6, the method further comprising:

randomly selecting the plurality of media players to audit the failure.

8. The method in accordance with claim 1, the method further comprising:

cross-referencing a failure to content or source code in the first media file.

9. The method in accordance with claim 1, wherein the response provides performance reporting, including any failures that occur during playback of the first media file.

10. The method in accordance with claim 1, wherein the first media file comprises one of a game application, movie, song, theme, picture, and accessory to a game application.

11. The method in accordance with claim 9, the method further comprising:

storing information about a failure based on whether the failure is known.

12. The method in accordance with claim 1, the method further comprising:

registering the use of the first media file to avoid testing collisions.

13. The method in accordance with claim 1, wherein:

retrieving comprises selecting a work item from a wordlist stored in the media file database, the work item linked to the first media file that is playable in the one or more media players, and the first string comprises a first portion identifying at least one of a menu system or a process and a second portion identifying an inquiry made to the at least one of a menu system or a process; and further wherein the second string identifies to the media tester, a user input that is currently highlighted in a user interface of the first media player.

14. A computer system comprising:

a processor for selecting a work item from a wordlist stored in a media file database, the work item linked to a media file playable in one or more media players, and for loading the media file onto at least one media player, a test hook located in a first media player, the test hook configured to interact with a media tester via commands and responses, the commands and response comprising at least one string, the test hook operable to perform automated testing of the first media file in the first media player by simulating human interaction comprising:

sending from the media tester, via a communication network, at least one command to the first media player that simulates at least one human input, the at least one command comprising a first string; and transmitting from the first media player to the media tester, via the communication network, a response to the at least one command, the response comprising a second string generated by the first test hook upon monitoring of at least one state of the first media player, the at least one state associated with a test procedure directed at identifying defects during playback of the first media file in the first media player; and a performance monitor communicatively coupled to the test hook located in the first media player, the performance monitor operable to monitor playback of the media file on the first media player and cross-referencing any failures to content or source code in the media file.

15. The computer system in accordance with claim 14, further comprising:

at least one memory configured as the media files database for storing media files to be tested and work items related thereto; and a media crawler for cataloging the media files and for creating the work items.

16. The computer system in accordance with claim 14, wherein the processor is operable to execute a first test mode to test one or more media files once and a second test mode to test the one or more media files multiple times.

17. The computer system in accordance with claim 14, further comprising:
   an evaluator for evaluating failures by categorizing, ranking, prioritizing, assigning or otherwise rendering a judgment pertaining to the failures.

18. The computer system in accordance with claim 14, further comprising a catastrophic failure monitor, wherein the performance monitor and catastrophic failure monitor report failures and provide information to reproduce them.

19. The computer system in accordance with claim 14, wherein the processor is configured to retest media files for at least some failures that occur during playback of the media file.

20. A computer-readable storage medium that is not a transient signal, the computer-readable storage medium comprising computer-executable instructions that when executed by a processor effectuate operations comprising:
   retrieving a media file from a media file database;
   providing the media file to a first media player;
   simulating human interaction with the first media player, wherein simulating human interaction comprises receiving from a media tester, via a communication network, a command that simulates a human input, the command comprising a first string;
   playing the media file on the first media player;
   monitoring the first media player during playback of the media file; and
   transmitting from the first media player to the media tester, a response to the command, the response comprising a second string generated by a first test hook located in the first media player upon monitoring of at least one state of the first media player, the at least one state associated with a test procedure directed at identifying defects during playback of the media file in the first media player.

* * * * *

UNITED STATES PATENT AND TRADEMARK OFFICE
CERTIFICATE OF CORRECTION

PATENT NO. : 8,387,015 B2
APPLICATION NO. : 12/023330
DATED : February 26, 2013
INVENTOR(S) : Christensen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1311 days.

Signed and Sealed this
Eighteenth Day of November, 2014

Michelle K. Lee
*Deputy Director of the United States Patent and Trademark Office*